(12) United States Patent
Dobler

(10) Patent No.: US 9,974,375 B2
(45) Date of Patent: May 22, 2018

(54) FRAGRANCE SAMPLER HAVING AN INTEGRAL APPLICATOR

(71) Applicant: Sven Dobler, Huntington, NY (US)

(72) Inventor: Sven Dobler, Huntington, NY (US)

(73) Assignee: Orlandi, Inc., Farmingdale, NY (US)

( * ) Notice: Subject to any disclaimer, the term of this patent is extended or adjusted under 35 U.S.C. 154(b) by 552 days.

(21) Appl. No.: 14/121,165

(22) Filed: Aug. 7, 2014

(65) Prior Publication Data

US 2015/0063895 A1 Mar. 5, 2015

Related U.S. Application Data

(60) Provisional application No. 61/959,714, filed on Sep. 3, 2013.

(51) Int. Cl.
*B65D 73/00* (2006.01)
*A45D 37/00* (2006.01)
*B32B 37/22* (2006.01)
*B32B 38/00* (2006.01)

(52) U.S. Cl.
CPC ............ *A45D 37/00* (2013.01); *B32B 37/226* (2013.01); *B32B 38/0004* (2013.01); *B32B 38/145* (2013.01); *B65D 73/0007* (2013.01)

(58) Field of Classification Search
CPC ........ A45D 40/00; A45D 37/00; B32B 37/06; B65D 73/0007; B65D 73/0064; B65D 73/0042; B65D 73/0078
USPC .......... 401/132, 261; 493/344, 341; 206/471
See application file for complete search history.

(56) References Cited

U.S. PATENT DOCUMENTS

| | | | | |
|---|---|---|---|---|
| 2,175,133 A | * | 10/1939 | Singleton | A45D 40/00 132/317 |
| 2,557,141 A | * | 6/1951 | Rebora | A45D 40/0087 132/294 |
| 4,751,934 A | * | 6/1988 | Moir | A45D 40/0087 101/129 |
| 4,805,773 A | * | 2/1989 | Sabongi | A45D 40/0087 206/489 |
| 4,824,143 A | * | 4/1989 | Grainger | A45D 40/0087 132/317 |
| 4,876,136 A | * | 10/1989 | Chang | A45D 40/0087 132/320 |
| 4,890,872 A | * | 1/1990 | Parrotta | A45D 40/0087 132/317 |
| 4,998,621 A | * | 3/1991 | Meehan | A45D 40/0087 206/466 |
| 5,161,688 A | * | 11/1992 | Muchin | A45D 40/0087 132/320 |
| 5,348,031 A | * | 9/1994 | Cloud | A45D 40/0087 132/294 |

(Continued)

*Primary Examiner* — David Walczak
*Assistant Examiner* — Joshua Wiljanen
(74) *Attorney, Agent, or Firm* — Paul M. Denk

(57) ABSTRACT

A fragrance sampler having an integral applicator is disclosed in which the sampler comprises a top ply having an upper surface and a lower surface, a mid ply having an upper surface, an outer perimeter edge, a back surface, a well formed therein, a bead of adhesive surrounding the well, and an area between the bead of adhesive and the outer perimeter edge, a non-woven material applicator having a sample material incorporated therein with the applicator being sized and shaped to fit within the well, and a bottom ply having a front surface and a back surface.

3 Claims, 3 Drawing Sheets

(56) References Cited

U.S. PATENT DOCUMENTS

| | | | | |
|---|---|---|---|---|
| 5,373,966 A * | 12/1994 | O'Reilly | ............... | B65D 75/38 206/484 |
| 5,569,230 A * | 10/1996 | Fisher | ............... | A61F 13/47218 206/438 |
| 5,645,161 A * | 7/1997 | Whitaker | ........... | A45D 40/0087 206/0.5 |
| 5,690,130 A * | 11/1997 | Gunderman | ....... | A45D 40/0087 132/319 |
| 5,715,849 A * | 2/1998 | Vanbraekel | ........ | A45D 40/0087 101/129 |
| 5,928,748 A * | 7/1999 | Jones | ................ | A45D 40/0087 239/34 |
| 6,063,229 A * | 5/2000 | Miles | .................... | B65H 33/00 156/277 |
| 6,070,392 A * | 6/2000 | Berman | ............ | A45D 40/0087 53/127 |
| 6,223,787 B1 * | 5/2001 | Graham | ................ | A45D 33/02 141/114 |
| 6,326,069 B1 * | 12/2001 | Barnett | ................. | A45D 37/00 206/229 |
| 6,461,620 B2 * | 10/2002 | Dobler | ............... | A45D 40/0087 206/484 |
| 6,691,872 B1 * | 2/2004 | Berman | ............. | A45D 40/0087 206/484 |
| 7,235,250 B2 * | 6/2007 | Padlo | ................... | A61K 8/0208 424/400 |
| 8,464,731 B1 * | 6/2013 | Eberlein | .............. | A45D 40/221 132/301 |
| 8,763,805 B2 * | 7/2014 | Greenland | ......... | A45D 40/0087 206/460 |
| 9,272,830 B2 * | 3/2016 | Greenland | ............... | B65B 3/02 |
| 2003/0010670 A1 * | 1/2003 | Dobler | .............. | A45D 40/0087 206/581 |
| 2003/0213724 A1 * | 11/2003 | Dobler | .............. | A45D 40/0087 206/581 |
| 2009/0300865 A1 * | 12/2009 | Spain | .................... | A45D 33/02 15/105 |
| 2012/0244316 A1 * | 9/2012 | Dobler | .................. | A61M 35/00 428/141 |
| 2013/0108351 A1 * | 5/2013 | Yeats | ..................... | A61Q 15/00 401/132 |
| 2013/0152963 A1 * | 6/2013 | Dobler | .................. | A45D 40/00 132/320 |
| 2013/0248613 A1 * | 9/2013 | Dobler | ..................... | A61L 9/12 239/6 |
| 2016/0000957 A1 * | 1/2016 | Dobler | ..................... | A61L 9/12 239/34 |
| 2016/0100670 A1 * | 4/2016 | Dobler | ..................... | B65D 75/5855 206/484.2 |
| 2016/0133166 A1 * | 5/2016 | Dobler | ..................... | G09F 5/04 428/34.2 |

\* cited by examiner

FRAGRANCE SAMPLER HAVING AN INTEGRAL APPLICATOR

CROSS REFERENCE TO RELATED APPLICATION

This non-provisional patent application claims priority to the provisional patent application having Ser. No. 61/959,714, filed on Sep. 3, 2013.

FIELD OF THE DISCLOSURE

This disclosure generally relates to a fragrance sampler and more particularly to a fragrance sampler having an integral applicator for applying a sample material.

BACKGROUND

Product samplers containing fragrances, cosmetics, and pharmaceutical formulations have been distributed in various manners such as in newspapers, magazines, direct mailers, and display cards. The product samplers are used by potential customers to test product contained within the sampler to determine if the product should be purchased. The sampler may contain crèmes or lotions and the sampler can rupture or burst during manufacturing, shipping, or handling. If the sampler is included within a newspaper or a magazine, leakage of crèmes or lotions would be unacceptable to the publisher because the newspaper or magazine would be damaged or destroyed. In order to prevent rupture of a sampler, some samplers have been produced that have strong hermetic seals. However, samplers constructed in this manner require a knife or scissors to open the sampler. Further, the sampler may be provided with a notch to assist in opening the sampler. Although the notch may be convenient, if the sampler contains a liquid, the liquid may spill when opening the sampler. Another known sampler device is a fluid sampler pouch having an internal supportive structure. This particular sampler device has a central core that is designed to serve as an internal supportive structure intended to support loads when the sampler is stacked alone or in combination with printed materials. The central core is also intended to contain a sample material. However, since the central core is used to support any weight placed on the sampler, the central core is subject to deformation and destruction.

The fragrance sampler having an integral applicator of the present disclosure is designed to obviate and overcome many of the disadvantages and shortcomings experienced with prior sampler. Moreover, the present disclosure is related to a fragrance sampler having an integral applicator that is constructed with sufficient strength so that the sampler will not burst or prematurely open exposing the applicator.

SUMMARY OF THE DISCLOSURE

In one form of the present disclosure a fragrance sampler having an integral applicator is disclosed in which the sampler comprises a top ply having an upper surface and a lower surface, a mid ply having an upper surface, an outer perimeter edge, a back surface, a well formed therein, a bead of adhesive surrounding the well, and an area between the bead of adhesive and the outer perimeter edge, a non-woven material applicator having a sample material incorporated therein with the applicator being sized and shaped to fit within the well, and a bottom ply having a front surface and a back surface.

In light of the foregoing comments, it will be recognized that the present disclosure provides a fragrance sampler having an integral applicator that may be removed from the sampler for application of a sample material incorporated into the integral applicator.

The present disclosure provides a fragrance sampler having an integral applicator that can be easily employed with highly reliable results and can be positioned on a substrate such as a newspaper, a magazine, a direct mailer, or a display card.

The present disclosure also provides a fragrance sampler having an integral applicator that may be produced or manufactured on conventional equipment.

The present disclosure provides a fragrance sampler having an integral applicator that provides against compression failure by supporting any weight along an exterior area or portion of the sampler.

The present disclosure provides a fragrance sampler having an integral applicator that allows previewing of sample material contained within the sampler without having to dispense or use the sample material.

These and other advantages of the present disclosure will become apparent to those skilled in the art after considering the following detailed specification in conjunction with the accompanying drawings.

DETAILED DESCRIPTION OF PREFERRED EMBODIMENTS

Figure 1:
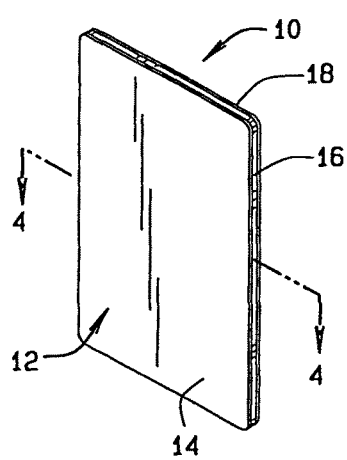
FIG. 1 is a perspective view of a fragrance sampler having an integral applicator constructed according to the present disclosure.

Referring now to the drawings, wherein like numbers refer to like items, number 10 identifies a preferred embodiment of a fragrance sampler having an integral applicator constructed according to the present disclosure. With reference now to FIG. 1, the fragrance sampler 10 comprises a top ply 12 having an upper surface 14 with the top ply 12, mid ply 16, and a bottom ply 18. The mid ply 16 may be comprised of a material that is harder or thicker than the top ply 12. The top ply 12, the mid ply 16, and the bottom ply 18 may be formed from materials such as paper, plastic, thermoplastics, polymer materials, synthetic materials, films, foils, polyethylene, polyester laminated structures, or aluminum containing structures or combinations and compositions thereof. The top ply 12 may be adhered to the mid ply 16 and the bottom ply 18 may be adhered to the mid ply 16 by heat sealing or by use of an adhesive. The top ply 12 is dimensionally substantially the same size as the mid ply 16 and the bottom ply 18. Although not shown in this particular view, it is possible and contemplated that the top ply 12 may have printed matter, graphic designs, decorations, or embossing incorporated thereon. For example, the top ply 12 may have a logo, a trademark, or other information, such as contact information, printed thereon.

Figure 2:
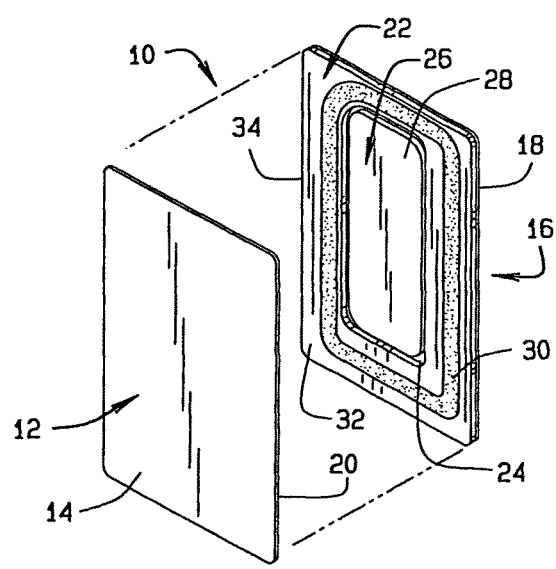
FIG. 2 is a partial exploded view of the fragrance sampler having an integral applicator constructed according to the present invention.

FIG. 2 is a partial exploded view of the fragrance sampler 10 with the top ply 12 removed or peeled away from the mid ply 16. The top ply 12 has the upper surface 14 and a lower surface 20. The mid ply 16 comprises an upper surface 22 having a well 24 formed or embossed therein, a non-woven material applicator 26 having a sample material 28 incorporated therein with the applicator 26 being sized and shaped to fit within the well 24, and a bead of adhesive 30 that surrounds the well 24. The bottom ply 18 is shown being adhered to the mid ply 16. Although the bead 30 is shown extending around the entire perimeter of the well 24, it is possible that the bead 30 is only formed around a portion of the perimeter of the well 24. An area 32 is defined between the bead 30 and an outer perimeter edge 34 that is not sealed or glued down to facilitate opening of the sampler 10. The sample material 28 may be a fragrance, a cosmetic, or a pharmaceutical preparation and the applicator 26 may be used to apply the sample material 28. As indicated, the applicator 26 may have the sample material 28 incorporated therein. The applicator 26 allows a consumer to either smell a fragrance impregnated or absorbed into the applicator 26 or view a cosmetic or a pharmaceutical formulation on the applicator 26. The applicator 26 may comprise a material that is chemically inert so that the applicator 26 does not react with the sample material 28.

The top ply 12 is heat sealed, adhered, or connected to the mid ply 16. The top ply 12 may be peeled away from the mid ply 16 to gain access to the applicator 26. Further, top ply 12 and the mid ply 16 engage each other at the bead 30 to provide a liquid tight seal between the top ply 12 and the mid ply 16. The top ply 12 is sealed or attached to the mid ply 16 with sufficient strength so that the applicator 26 is contained within the well 24 during manufacturing, transporting, storage, and use of the sampler 10. Further, the mid ply 16 provides sufficient thickness during the manufacturing process of the sampler 10 so that the applicator 26 is not damaged.

Figure 3:
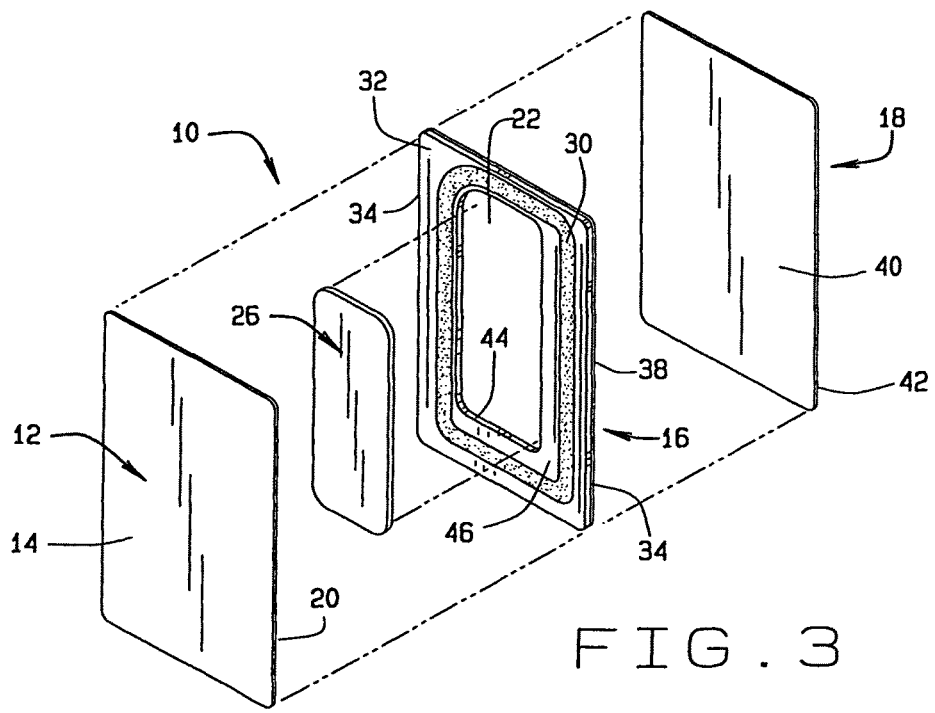
FIG. 3 is another exploded view of the fragrance sample having an integral applicator constructed according to the present disclosure.

With reference now to FIG. 3, an exploded view of the sampler 10 is illustrated. The sampler 10 comprises the top ply 12, the applicator 26, the mid ply 16, and the bottom ply 18. The mid ply 16 has the upper surface 22, the side edge 34, and a back surface 38. The bottom ply 18 has a front surface 40 and a back surface 42. The sampler 10 may have an adhesive (not shown) on the back surface 42 of the bottom ply 18 to adhere the sampler 10 to a substrate (not shown). The well 24 is shown die cut into the mid ply 16 and the well 24 has a perimeter edge portion 44. The well 24 is sized and shaped to hold and retain the applicator 26. An area 46 is formed between the bead 28 and an inner perimeter edge 40 of the well 24. The area 32 between the bead 30 and the outer perimeter edge 34 is also shown. The areas 32 and 46, as well as the adhesive bead 30, are provided for strengthening the sampler 10 and also for protecting the applicator 26. Any weight resting on the sampler 10 will rest on the areas 32 and 44 and the bead 30 and not on the applicator 26. In this manner, any forces applied to the sampler 10 will not cause the sampler 10 to rupture exposing the applicator 26 within the sampler 10.

Figure 4:
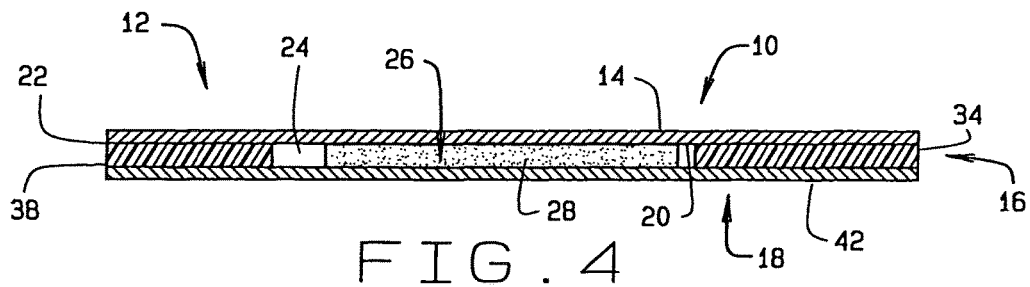
FIG. 4 is an enlarged cross-sectional view of the fragrance sampler having an integral applicator shown in FIG. 1 taken along the plane of line 4-4.

FIG. 4 depicts a cross-sectional view of the sampler 10. The sampler 10 comprises the top ply 12 heat sealed to the mid ply 16. The top ply 12 has the upper surface 14 and the bottom surface 20. The mid ply 16 is shown having the upper surface 22 having the well 24 formed therein; the applicator 26 having the sample material 28 incorporated therein, the edge 34, and the back surface 38. The bottom ply 18 is also heat sealed to the mid ply 16. The bottom ply 18 has the front surface 40 and the back surface 42.

Figure 5:
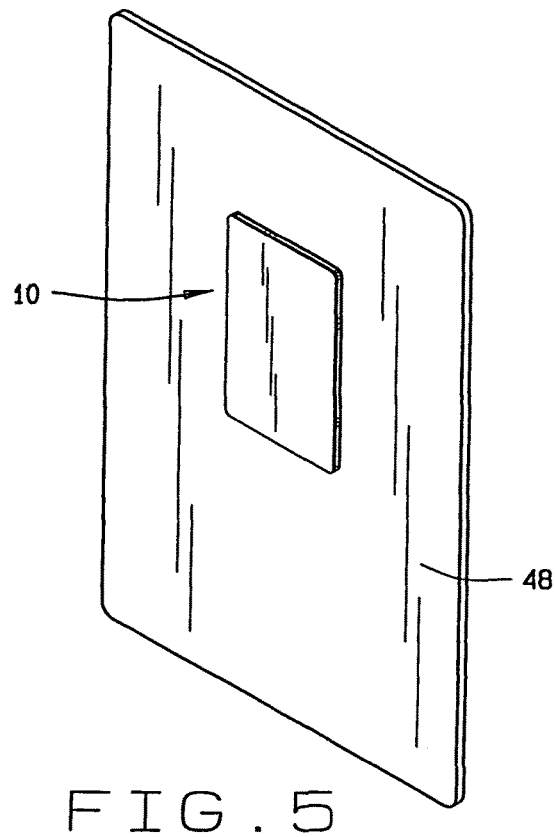
FIG. 5 is a perspective view of the fragrance sampler having an integral applicator constructed according to the present disclosure being attached a to substrate.

Referring now to FIG. 5, the sampler 10 is shown attached to a substrate 48, such as a display board or a magazine. As can be appreciated, the sampler 10 may be removed from the substrate 48 by grasping the sampler 10 and removing the entire sampler 10 from the substrate 48. Once removed, the top ply 12 may be peeled from the mid ply 16 to remove the applicator 26 from the well 24. Alternatively, the top ply 12 may be peeled away from the mid ply 16 to expose the applicator 26 without removing the sampler 10 from the substrate 48.

Figure 6:
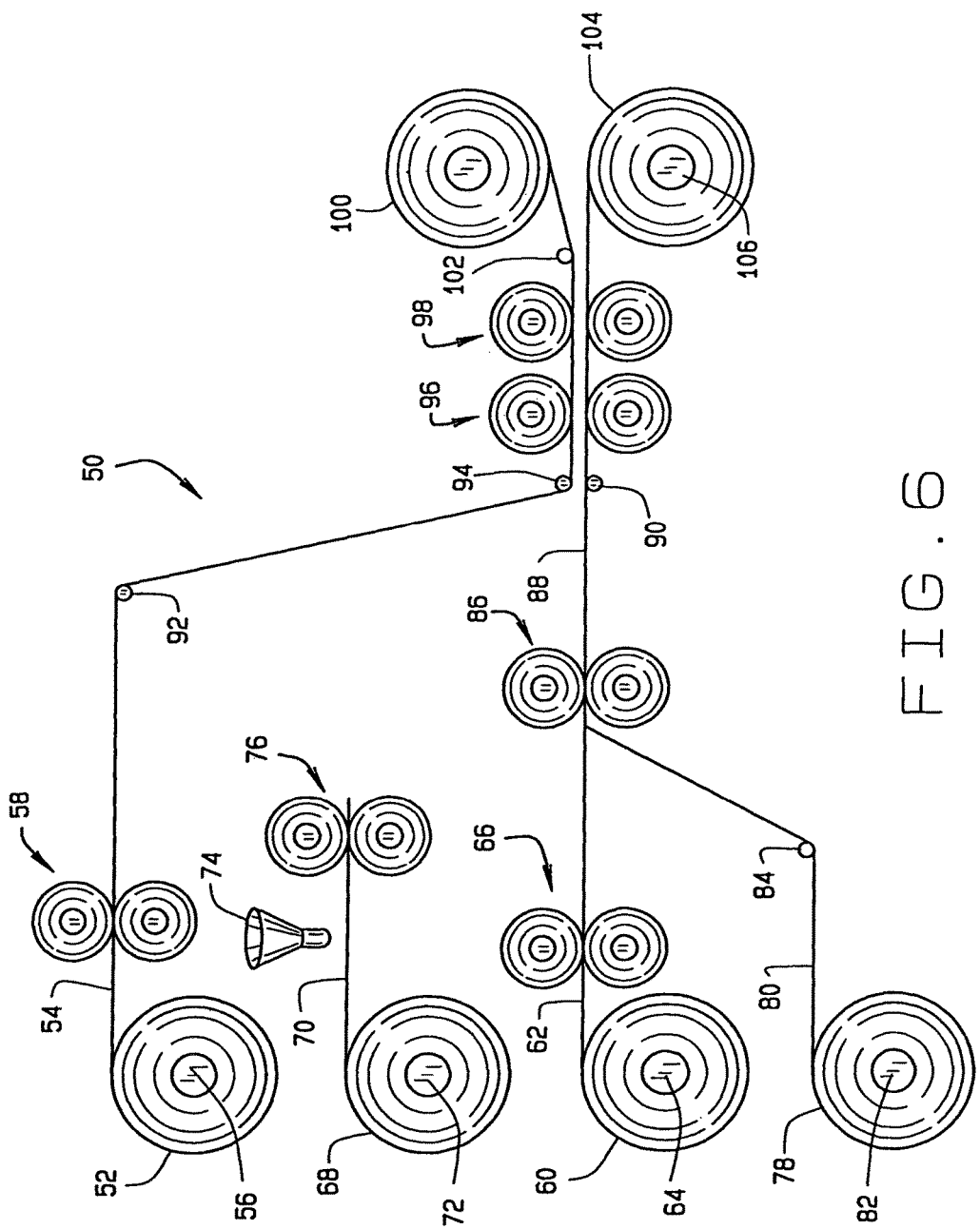
FIG. 6 is a schematic diagram of a process for manufacturing the fragrance sampler having an integral applicator constructed according to the present disclosure.

With reference now to FIG. 6, a process or method 50 for manufacturing the fragrance sampler having an integral applicator 10 is shown schematically. A web 52 of a top ply material 54 is originally contained on a roller 56. The top ply material 54 has a plurality of the top ply 12 thereon. The top ply material 54 is pulled off or unwound from the roller 56 and passed through a printing station 58. At the printer station 58 desired graphics are printed on the material 54. For example, graphics may be printed on each top surface 14 of each top ply 12. A web 60 of a mid ply material 62 is contained on a roller 64. The mid ply material 62 has a plurality of the mid ply 16 thereon. The mid ply material 62 unwinds from the roller 64 and passes through a die cut station 66. The well 22 is formed in each middle ply 16 at the station 66. A web 68 of non-woven material 70, which is used to form a plurality of the applicators 26, is wound on a roller 72. The web 68 passes under an injection station 74 where each applicator 26 is injected with the sample material 28. The sample material 28 may take the form of a liquid fragrance sample. The web 68 then passes to a die cut station 76 where each individual applicator 26 is deposited into the well 24 formed in the mid ply material 62. A web 78 of bottom ply material 80 wound on a roller 82 with the web having a plurality of the bottom ply 18 thereon. The bottom ply material 80 is unwound from the roller 82, passes by a roller 84 that directs the web 78 upwards toward a sealing station 86. The web 80 is heat sealed to the web 62. In particular, the front surface 40 of the bottom ply 18 is heat sealed to the back surface 38 of the mid ply 16. This forms a web of material 88, which is the web 80 sealed to the web 62, which is directed to a roller 90.

A first roller 92 and a second roller 94 direct the top ply material 54 down toward the web of material 88 to bring the top ply material 54 into close proximity with the material 88. The roller 90 is also used to direct the material 88 toward the top ply material 54. The path of travel of the material 88 is preferably substantially horizontal, at least after the sealing station 86 has been encountered. This will be done to prevent the applicator 26 from falling out of the well 24. However, the process 50 could be designed so that the top ply material 54 is brought up to the material 88.

The top ply material 54 and the material 88 are then passed through a sealing station 96 where each top ply 12 is adhered to a corresponding mid ply 16. As can be appreciated, the top ply material 54 and the material 88 may move at an indexed rate such that when the two materials 54 and 88 are brought together at the sealing station 96, the mid ply 16 will be in alignment with the top ply 12. The sealing station 96, as well as the sealing station 86, may be a heat sealer, and the top ply 12 and the mid ply 16 can be adhered or sealed together for example, by welding, such as friction, sonic, or ultrasonic welding, or other standard heat sealing processes which will create a seal between the two plies 12 and 16. Alternatively, the sealing station 96 can utilize an adhesive, such as cationic cure coating adhesives, traditional cohesive seals, or adhesive seals, which will bind the top ply 12 and the mid ply 16 together. The top ply 12 may also be adhered to the mid ply 16 by lamination or sonic seal. Once the top ply 12 is adhered to the mid ply 16, the joined ply materials 54 and 88 are passed to a multilevel rotary die-cut station 98. The formed fragrance samplers 10 are then collected on a product roller 100 by being directed upwardly by a roller 102. The fragrance samplers 10 may be delivered in roll form for automatic applications to other printed materials, such as being placed on a newspaper or a magazine. The samplers 10 can also be fan-folded for final affixing later onto a substrate. The die-cutting station 98 can also form perforations between adjacent samplers 10 to facilitate separation of the samplers 10. Waste material 104 can be collected on a waste roller 106 to be discarded or recycled.

As previously indicated, a layer of adhesive (not shown) may be applied to the back surface 42 of the bottom ply 18 to act as a release liner that is used so that the sampler 10 can later be readily applied to another substrate, such as a newspaper or a magazine, using affixing equipment. The layer of adhesive can be applied to the bottom ply 18 either as a pre-treatment or prior to passing the sealing station 86.

It is also possible that the top ply material 54, the mid ply material 62, and the bottom ply material 80 may be pre-formed or pre-printed offline to produce the continuous web 52 of top ply material 54 to be placed on the roller 56, to produce the continuous web 60 of mid ply material 62 to be placed on the roller 64, and the continuous web 78 of bottom ply material 80 to be placed on the roller 82. As can be appreciated, the webs 60 and 78 are threaded into machinery, such that when the webs 62 and 80 are brought together at the sealing station 86, the mid ply material 62 and the bottom ply material 80 will be in register. Also, as the top ply material 54 is being processed, the mid ply material 62 is also being processed, and the bottom ply material 80 is being directed to the sealing station 86 so that the process 50 is continuous.

From all that has been said, it will be clear that there has thus been shown and described herein a fragrance sampler having an integral applicator. It will become apparent to those skilled in the art, however, that many changes, modifications, variations, and other uses and applications of the subject fragrance sampler having an integral applicator are possible and contemplated. All changes, modifications, variations, and other uses and applications which do not depart from the spirit and scope of the disclosure are deemed to be covered by the disclosure, which is limited only by the claims which follow.

What is claimed is:

1. A fragrance sampler having an integral applicator comprising:
   a top ply having an upper surface and a lower surface;
   a mid ply having an upper surface, an outer perimeter edge, a back surface, a well formed therein, and a bead of adhesive or a heat seal for surrounding the well, and an area between the bead of adhesive or heat seal and the outer perimeter edge of the mid ply, so that the top ply proximate its outer edge can be easily peeled free from the mid ply;
   a non-woven material applicator having a sample material incorporated therein with the applicator being sized and shaped to fit within the well, said applicator capable of being fully removed from the sampler during usage;
   a bottom ply having a front surface and a back surface;
   said well comprises an inner perimeter edge and the fragrance sampler further comprises a second area between the bead of adhesive or heat seal and the sampler;
   said top ply has a thickness and the mid ply has a thickness, and the thickness of the mid ply is greater than the thickness of the top ply and is formed of harder material to prevent compressing of the applicator and its damaging; and
   wherein the back surface of the mid ply is adhered to the front surface of the bottom ply.

2. The fragrance sampler having an integral applicator of claim 1 wherein the back surface of the bottom ply has an adhesive with the adhesive for securing the sampler on a substrate such as a magazine, newspaper, mailer or display card.

3. The fragrance sampler of claim 1 wherein said bottom ply may be formed of one of paper, plastic, thermoplastics, polymer materials, synthetic materials, films, foils, polyethylene, polyester laminated structures, and aluminum.

* * * * *